April 20, 1937.     R. M. McILVANA     2,077,846
MILK COOLER
Filed Sept. 5, 1936
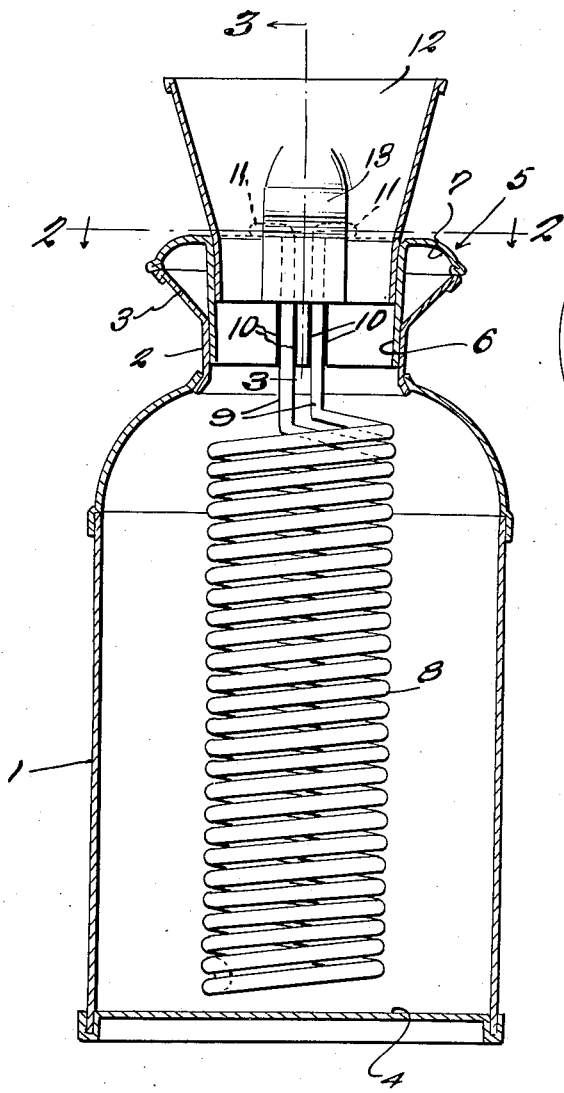
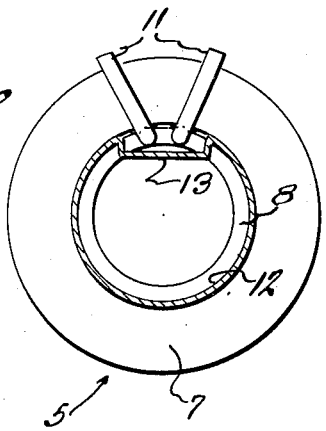
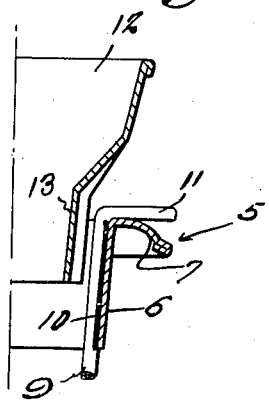
Inventor
Ralph M. McIlvana
By Clarence A. O'Brien
Hyman Berman
Attorneys Patented Apr. 20, 1937

2,077,846

UNITED STATES PATENT OFFICE 2,077,846

MILK COOLER

Ralph M. McIlvana, Brookline, Mass.

Application September 5, 1936, Serial No. 99,651

3 Claims. (Cl. 257—199)

The present invention relates to new and useful improvements in milk coolers and has for one of its important objects to provide, in a manner as hereinafter set forth, a device of this character which is adapted to be expeditiously mounted in position in a conventional milk can and which, when so mounted, will thoroughly and quickly cool the milk therein.

Another very important object of the invention is to provide a cooler of the aforementioned character embodying a construction and arrangement which is such that the use of a conventional filter or strainer will be permitted, thus allowing the milk to be filtered or strained and cooled simultaneously.

Other objects of the invention are to provide a milk cooler of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in vertical section of the invention, showing same mounted in position in a milk can.

Figure 2 is a view in horizontal section, taken substantially on the line 2—2 of Figure 1.

Figure 3 is a vertical sectional view, taken substantially on the line 3—3 of Figure 1.

Referring now to the drawing in detail, it will be seen that the reference numeral 1 designates a conventional milk can having a neck 2 provided with a flared mouth 3. The reference numeral 4 designates the bottom of the can 1.

The reference numeral 5 designates generally a cover, said cover including a skirt 6 which is slidably engageable in the neck 2, as illustrated to advantage in Figure 1 of the drawing. The cover 5 further includes a downwardly curved flange 7 on the upper end of the skirt 6 which is adapted to rest on the upper end of the mouth 3 of the neck 2.

The reference numeral 8 designates a double coil which is rigidly mounted in the cover 7 and which is adapted to depend therefrom into the can 1 to a point adjacent the bottom 4 of said can. It will be observed that both of the leads 9 extend from the upper end of the double coil 8, said leads being rigidly secured to the skirt portion 6 of the cover 5 preferably by soldering or welding, as at 10. The leads 9 terminate in right angularly extending upper end portions 11 which project above the flange 7 of the cover 5 for connection with supply and exhaust conduits.

The reference numeral 12 designates a removable funnel or adapter which is slidably mounted in the skirt portion 6 of the cover 5. It will be noted that the adapter 12 has a vertical channel 13 pressed into one side thereof to accommodate the leads 9 of the double coil 8.

It is thought that the operation of the cooler will be readily apparent from a consideration of the foregoing. Supply and discharge conduits (not shown) are connected to the upper end portions 11 of the coil leads 9 for circulating a cooling liquid, such as water, through the double coil 8 in a manner to quickly and thoroughly cool the milk in the can 1. It will be observed that the construction and arrangement is such that the device may be expeditiously mounted in position in a milk can and removed therefrom. The presence of the device in the can interferes in no way with the pouring of the milk into said can. Further, a conventional strainer or filter may, if desired, be mounted in the adapter 12 for cleaning the milk as it is poured into the can.

It is believed that the many advantages of a milk cooler constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A milk cooler comprising a cover engageable in a milk can, said cover including a skirt open at both ends and adapted for insertion in the can, and a double coil mounted on the cover and depending therefrom, said coil including leads extending from its upper end through the skirt of the cover and rigidly secured to said skirt.

2. A milk cooler comprising, in combination, a cover adapted to be removably mounted on a milk can, said cover including a skirt open at both ends and slidably engagable in the can, a double coil depending from the cover, said coil including leads extending upwardly from its upper end through the cover and rigidly secured to the skirt, and an adapter slidably mounted in the cover, said adapter including an inwardly pressed channel portion accommodating the leads of the coils.

3. A milk cooler comprising, in combination, a cover adapted to be removably mounted on a can, said cover including a skirt portion slidably insertable in the can, and further including a flange on the upper end of said skirt portion, a double coil mounted on the cover and depending therefrom, said coil including inlet and outlet leads extending upwardly from its upper end through the cover and rigidly secured to the skirt portion, said leads terminating in substantially right angularly extending upper end portions for connection with fluid conduits, and an adapter removably mounted in the cover, said adapter including an inwardly pressed channel portion accommodating the leads of the coils.

RALPH M. McILVANA.